United States Patent Office 3,221,001
Patented Nov. 30, 1965

3,221,001
POLYMERIZATION OF ETHYLENE IN THE PRESENCE OF INORGANIC SALT HYDRATES
Isidor Kirshenbaum, Westfield, and Peter Lucchesi, Newark, N.J., assignors to Esso Research and Engineering Company, a corporation of Delaware
No Drawing. Filed Feb. 12, 1962, Ser. No. 172,755
9 Claims. (Cl. 260—94.9)

This invention relates to improved catalysts for polymerizing ethylene. More particularly, it relates to a process wherein the ethylene is polymerized in the presence of inorganic salt hydrates.

The use of the so-called Fischer catalyst system of aluminum metal, aluminum chloride, and titanium tetrachloride for polymerizing ethylene to solid crystalline polymers is well known. In an effort to increase the catalyst efficiency and yield of solid polymer, it is also well known to utilize larger amounts of aluminum. Despite the increased concentrations of aluminum, it is still desirable to further improve the operation and produce a polyethylene product suitable for blow molding purposes by decreasing the melt index and increasing molecular weight.

It has now been found that these purposes can be achieved by carrying out the ethylene polymerization in the presence of an inorganic salt hydrate which gives up a substantial portion of its water of hydration only during reaction conditions.

It is surprising that these improvements are obtained through the use of the hydrate salts because it had been believed that the addition of water actually lowers the molecular weight of the product. Conversely the utilization of an amount of water equivalent to that evolved from the hydrate salts of this invention decreases catalyst activity excessively and does not produce even comparable improvements.

The polyethylene produced by the catalysts of this invention thus have a molecular weight range of 200,000 to 400,000 (as determined by intrinsic viscosity using the Chiang equation (J. Polymer Sc. 36, 91 (1959)), and a melt index of 0.1 to 0.8 as contrasted with molecular weights of about 120,000 to 180,000 or less and melt indices of 1–5 or more when the hydrates are not employed. It has also been found that the polyethylenes produced in accordance with this invention have higher Izod notched impact resistance than do the polyethylenes produced when the hydrates are not employed.

The components of the catalyst in addition to the hydrates are used in the proportion of 0.3 to 3 moles and preferably 0.5 to 2 moles of $AlCl_3$ and 1 to 12 moles, preferably 1 to 3 moles of aluminum per mole of $TiCl_4$. It has also been found that in the presence of added hydrogen gas, $VCl_4$ can be used as a transition metal compound in admixture with Al and $AlCl_3$.

It is particularly preferred that the basic catalyst components be prepared by intimately contacting a finely divided aluminum powder with at least a portion of the aluminum chloride and then admixing the thus contacted materials with the remaining transition metal tetrachloride; as described in U.S. patent application Serial No. 161,353, filed Dec. 22, 1961.

The three catalyst components are dispersed in an inert hydrocarbon diluent of the cycloparaffin or aliphatic series, e.g., a straight or branched chain, $C_5$ to $C_{15}$ aliphatic hydrocarbon containing only the elements carbon and hydrogen. The quantities of diluent that can be employed range from 5 to 1000 volumes of diluent per total volume of catalyst components, preferably 100 to 500 volumes of diluent per volume of catalyst. However, a trace of aromatic diluent such as benzene or an alkylbenzene may be present in addition to the aliphatic diluent.

The inorganic salt hydrates employed are characterized as those which give up a substantial portion, i.e., a minimum of 30 weight percent of their combined water, at only a minimum temperature of about 100° C. Those hydrates which evolve a substantial portion of combined water at lower temperatures are unsuitable because they decrease catalyst activity excessively and in some cases destroy the activity almost completely and often do not produce suitable polymer. Examples of hydrates that have been suitable (type A) and those which are not acceptable (type B) are listed in Table I. The decomposition temperatures refer to the temperatures listed in such standard reference books as "Handbook of Chemistry and Physics" and Mellor's "A Comprehensive Treatise on Inorganic and Theoretical Chemistry." For example the decomposition temperature of the $BaCl_2 \cdot 2H_2O$ hydrate is listed as 113° C. in the Handbook of Chemistry and Physics, 37th edition (1955–6), pages 478–9 (Chemical Rubber Publishing Co.). Thos salts which meet the criteria expressed are readily ascertainable.

Table I

| | Decomposition temp., ° C. |
|---|---|
| Type A: | |
| $BaCl_2 \cdot 2H_2O$ | 113 |
| $MnSO_4 \cdot H_2O$ | 152 |
| $Cu(NO_3)_2 \cdot 3H_2O$ | 114 |
| $AlCl_3 \cdot 6H_2O$ | >110 |
| Type B: | |
| $SnCl_2 \cdot 2H_2O$ | 38 |
| $Na_3PO_4 \cdot 12H_2O$ | 73 |
| $Ni(NO_3)_2 \cdot 6H_2O$ | 57 |
| $MgSO_4 \cdot 7H_2O$ | 48 |
| $Ca(NO_3)_2 \cdot 4H_2O$ | 40–50 |
| $CuSo_4 \cdot 5H_2O$ | ~60 |

The inorganic salt hydrate is employed in an amount of from 0.05 to 1.25 millimoles of hydrate per gram of catalyst. The actually preferred concentration range depends upon number and rate of release of the water molecules from the hydrate. Thus the preferred range for $BaCl_2 \cdot 2H_2O$ is higher than for $AlCl_3 \cdot 6H_2O$ and lower than that preferred for $MnSO_4 \cdot H_2O$. When using $BaCl_2 \cdot 2H_2O$ as the hydrate and the $Al/AlCl_3/TiCl_4$ catalyst in a 3/1/1 mole ratio, the preferred concentration of hydrate is 0.65–0.95 millimole per gram of total catalyst.

The hydrates can be added to the catalyst after ball milling, after dispersion in the diluent, or injected continuously into the reactor.

It is important to note that the improved catalyst thus obtained permits of the use of relatively small quantities in the reaction thus simplifying deashing problems. Thus amounts of catalyst as low as 1–2 grams per liter or diluent are preferred when using $Al/AlCl_3/TiCl_4$ catalyst in a 3/1/1 or a 3/1/2 mole ratio.

The reaction itself is conducted by placing the catalyst in the reactor with preferably from 100 to 500 parts of hydrocarbon diluent, as stated above, and from 20 to 60 grams of ethylene per gram of catalyst is injected therein. The reaction mixture is heated to a temperature of from 70 to 110° C. and preferably 80 to 100° C. Pressures of from 100 to 500 p.s.i.g. are preferably employed. Additional ethylene may be added during the reaction. At the end of the reaction the solid polymer is percipitated with about an equal quantity of a $C_1$ to $C_6$ alcohol such as ethyl alcohol, isopropyl alcohol and the like. The percipitated product is then washed with more alcohol.

This invention and its advantages will be better understood by reference to the following examples:

EXAMPLE 1

Tabulated below in Table II are a series of polymerization runs conducted with various inorganic salt hydrates of this invention. In Table III are tabulated the results obtained with various inorganic salts that do not qualify because the water is evolved at excessively low temperatures. In all cases the polymerization was conducted at 90° C., 100 p.s.i.g., in n-heptane for 1 hour.

*Table II*

| Hydrates: $Al/AlCl_3/TiCl_4$, Mole Ratio | 3/1/1 | 3/1/2 | 3/1/2 | 3/1/1 |
|---|---|---|---|---|
|  | $BaCl_2 \cdot 2H_2O$ | $CuNO_3 \cdot 3H_2O$ |  | $AlCl_3 \cdot 6H_2O$ |
| Additive: |  |  |  |  |
| G./g. catalyst | 0.212 | 0.224 | 0.226 | 0.024 |
| mMol/g. catalyst | 0.87 | 0.92 | 0.93 | 0.062 |
| Polymer: |  |  |  |  |
| G./g./hr. (total catalyst) | 37.8 | 30 | 30.2 | 45.2 |
| Melt Index at 190° C | 0.37 | 0.17 | 0.38 | 0.89 |
| Mol Wt. $\times 10^{-3}$ | 270 | 320 | 270 | 220 |

*Table III*

| Hydrates: $Al/AlCl_3/TiCl_4$, Mole Ratio | 3/1/2 | 3/1/2 | 3/1/2 | 3/1/2 |
|---|---|---|---|---|
|  | $SnCl_2 \cdot 2H_2O$ | $Na_3PO_4 \cdot 12H_2O$ | $Ni(NO_3)_2 \cdot 6H_2O$ | $MgSO_4 \cdot 7H_2O$ |
| Additive: |  |  |  |  |
| G./g. catalyst | 0.144 | 0.059 | 0.090 | 0.016 |
| mMol/g. catalyst | 0.64 | 0.16 | 0.31 | 0.07 |
| Polymer: |  |  |  |  |
| G./g./hr. (total catalyst) | 9.4 | 4.3 | 11.5 | 0.5 |
| Melt index at 190° C | 0.08 | 0.12 | 0.17 |  |
| Mol. Wt. $\times 10^{-3}$ | 430 | 380 | 350 |  |

| Hydrates: $Al/AlCl_3/TiCl_4$, Mole Ratio | 3/1/2 | 3/1/2 | 3/1/2 | 3/1/2 |
|---|---|---|---|---|
|  | $Ca(NO_3)_2 \cdot 4H_2O$ | $CuSO_4 \cdot 5H_2O$ | $CuAc_2 \cdot H_2O$ | $MgCl_2 \cdot 6H_2O$ |
| Additive: |  |  |  |  |
| G./g. catalyst | 0.110 | 0.093 | 0.372 | 0.063 |
| mMol/g. catalyst | 0.47 | 0.37 | 1.86 | 0.31 |
| Polymer: |  |  |  |  |
| G./g./hr. (total catalyst) | 15.5 | 8.1 | 10.8 | 14.5 |
| Melt index at 190° C | 0.16 | 0.03 | 0.12 | 0.07 |
| Mol. Wt. $\times 10^{-3}$ | 360 | 570 | 380 | 450 |

EXAMPLE 2

In a series of runs identical with those of Example 1 but no hydrate being present, the polymer product had melt indices in the range of 1.2–2.5 or higher, corresponding to molecular weights of 160,000–135,000.

EXAMPLE 3

In an experiment identical with those of Example 1 using a 3/1/2 catalyst and $MnSO_4 \cdot H_2O$ as the hydrate a melt index of 0.1 and a molecular weight of 400,000 was obtained.

In the above examples the hydrate was added by admixture with the catalyst. Using type A hydrate gave molecular weights in the desired range with satisfactory polymer yields. Using type B hydrate gave polymer yields of ½–1/10 those obtained with type A hydrates. With no hydrate the mol. wt. was too low.

EXAMPLE 4

An experiment was run to compare the effect of water addition as the inorganic salt hydrate as contrasted with free water. This experiment was conducted at 90° C. and 100 p.s.i.g. total pressure. A catalyst having a molar composition of $Al/AlCl_3/TiCl_4$ of 3/1/1 was used in the amount of 1.44 grams per liter of n-heptane. Water addition was effected in various manners. Thus free water was added with the catalyst in one case (A). In case B the free water was added with the ethylene feed and in cases C and D bound water was added with the catalyst as $BaCl_2 \cdot 2H_2O$. The results of the experiments are shown in Table IV.

*Table IV*

HYDRATE ADDITION IS NOT SAME AS $H_2O$ ADDITION

| Case | A | B | C | D |
|---|---|---|---|---|
| Additive | Water | Water | $BaCl_2 \cdot 2H_2O$ | $BaCl_2 \cdot 2H_2O$ |
| How Added | With Catalyst | With Feed | As Hydrate with Catalyst | As Hydrate with Catalyst |
| Amount free or bound water added Mg.$H_2O$ gm. Catalyst | 4.9 | 7 | 12 | 31 |
| Polymer yield, g. polymer/gm. in 1 hour | <5 | 12 | 43 | 41 |

This experiment demonstrates the deleterious effect of free water as contrasted with the inorganic hydrate. Although more potentially available water was added as the hydrate of this invention than as free water, the free water addition hurt yield as compared to the hydrate.

The advantages of this invention will be apparent to the skilled in the art. Improved catalyst systems are provided for polymerizing ethylene to products of superior characteristics in high efficiencies.

What is claimed is:

1. In a process for preparing solid crystalline polyethylene, of a molecular weight in the range of 200,000 to 400,000, by polymerizing ethylene in an inert diluent with a catalyst of aluminum, $AlCl_3$ and $TiCl_4$ at a temperature in the range of 70 to 110° C. and a pressure in the range of 100 to 500 p.s.i.g., the improvement which comprises carrying out the polymerization in the presence of an inorganic salt hydrate which has a decomposition temperature above about 100° C.

2. The process of claim 1 in which a temperature of 80° to 100° C. is employed.

3. The process of claim 1 in which the inorganic salt hydrate is employed in an amount of about 0.05 to 1.25 millimoles per gram of catalyst.

4. The process of claim 3 in which the inorganic salt hydrate is $BaCl_2 \cdot 2H_2O$.

5. The process of claim 3 in which the inorganic salt hydrate is $AlCl_3 \cdot 6H_2O$.

6. The process of claim 4 in which 0.5 to 2 moles of $AlCl_3$ and 1 to 3 moles of aluminum are employed per mole of $TiCl_4$.

7. A catalyst suitable for the polymerization of ethylene, to a product having a molecular weight in the range of 200,000 to 400,000, comprising from 0.5 to 2 moles of $AlCl_3$, 1 to 3 moles of aluminum per mole of $TiCl_4$ and about 0.05 to 1.25 millimoles, based on the catalyst, of an inorganic salt hydrate which has a decomposition temperature above about 100° C.

8. The catalyst of claim 7 in which the inorganic salt hydrate is $BaCl_2 \cdot 2H_2O$.

9. The catalyst of claim 7 in which the inorganic salt hydrate is $AlCl_3 \cdot 6H_2O$.

References Cited by the Examiner

UNITED STATES PATENTS

| 2,899,413 | 8/1959 | Hagemeyer et al. | 260—94.9 |
| 3,006,910 | 10/1961 | Prichett et al. | 260—94.9 |

OTHER REFERENCES

Emeleus et al.: Modern Aspects of Inorganic Chemistry, Routledge and Kegan Paul Ltd., London (1952) (pages 190–192 relied on).

JOSEPH L. SCHOFER, *Primary Examiner.*

M. LIEBMAN, JAMES A. SEIDLECK, *Examiners.*